Figure 1:
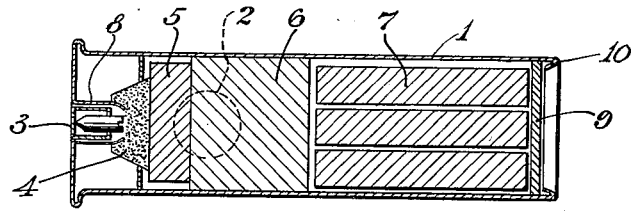

April 2, 1940.  J. M. HOLM  2,195,965
GAS PRODUCING CARTRIDGE
Filed Oct. 19, 1937  2 Sheets-Sheet 1

John MacFie Holm INVENTOR.

BY Thos. A. Wilson
ATTORNEY

April 2, 1940.　　　　　J. M. HOLM　　　　　2,195,965
GAS PRODUCING CARTRIDGE
Filed Oct. 19, 1937　　　　2 Sheets-Sheet 2

John MacFie Holm INVENTOR.
BY Thos. A. Wilson
ATTORNEY

Patented Apr. 2, 1940

2,195,965

UNITED STATES PATENT OFFICE 2,195,965

GAS PRODUCING CARTRIDGE

John Macfie Holm, Pollokshields, Glasgow, Scotland, assignor to Imperial Chemical Industries Limited, a corporation of Great Britain Application October 19, 1937, Serial No. 169,896
In Great Britain October 22, 1936

8 Claims. (Cl. 102—12)

The present invention relates to gas-pressure-operated mechanical devices and to charges or cartridges therefor. The present invention relates in particular to the provision of cartridges for the operation of mechanical devices in which a movable part is brought into contact or engagement with a second movable part having a relatively greater inertia or being otherwise subject to a much greater resistance to its motion, and to initiate and maintain the motion of the latter part for a necessary time at a desirably high speed. Such conditions are to be found, for instance, in the operation of aeroplane engine starters of the kind in which, by the action of gas pressure, longitudinal and/or rotational motion is conferred on a relatively light moving part to bring it into engagement with and cause it to rotate a heavy flywheel, or internal combustion engine, or the like, the gas pressure required to rotate the flywheel is usually much more than 10 times the pressure required to engage the two parts.

The chief difficulty encountered in the operation of such a device is that the motion of the movable part of high inertia or resistance upon which work is to be done, when once initiated, can be maintained only if the generation of the gases continues at an efficient operating speed; and this speed is likely to be far greater than that at which a pressure can be applied to the first movable part in its disengaged position without shock or damage to the machinery due to violent engagement of the two parts. Hence if in practice, a cartridge containing a gas-generating charge of the usual type is used in such a manner that the initial rate of generation of pressure is suitable for the gentle engagement of the two moving parts, the rate of generation of pressure is insufficient for the proper operation of the second part of the device; and if the rate of generation of pressure is sufficient to operate the latter in the desired manner, its rapidity in the earlier stages is likely to cause damage by violent engagement of the two moving parts.

The present invention has for its chief object the development of an improved cartridge for the operation of mechanical devices. A further object is a cartridge for the operation of mechanical devices, which cartridge, upon initiation, will produce initially a relatively slow evolution of gas followed by evolution at an increased rate. An additional object is a method for manufacturing said cartridge and the charges contained therein.

These objects are accomplished by the following invention. I have found that I can build up a charge for the actuation of gas pressure operable devices of the kind described in the first paragraph of this specification, if I use two essential elements, the first a compacted substantially ashless self-combustible section whose form and constitution are such that it is adapted to generate a gas pressure at a predetermined relatively slow rate, while the second element is substantially ashless and adapted to develop pressure at a substantially increased rate upon initiation, the two elements being so arranged in the cartridge case that the ignition of the second element is prevented until the first element is substantially completely burnt. Preferably the second section is not ignitable until an interval of time of the order of at least one second has elapsed after the commencement of the ignition of the first section.

According to the invention I employ as a partition for preventing the premature ignition of the second charge section, a section of combustible material jambed in the cartridge case and capable of being destroyed or charred through but not merely by the combustion of the priming means and a small remote portion of the section of the charge. The section used as a partition may consist of a gas-producing material and may consist of a disc or cylinder of material more difficultly ignitable than the first charge section material directly ignited by the priming means, by the combustion of which material it is in turn ignited. It is also possible however to use the material of the first charge section ignited by the priming means as the section jambed in the cartridge case, in which case the last burning part or the whole of the first charge section is effectively jambed in the cartridge case and itself screened from premature ignition by the priming means if necessary. The gas-evolving cylindrical section jambed in the cartridge case may thus be regarded as forming at least part of the first charge section. In the case where a disc of material other than that ignited by the priming means is employed, this may consist of a disc of celluloid, cardboard, felt, ebonite, phenol formaldehyde, resin or the like. I prefer to provide a small vent in the casing of the charge on the side remote from the igniter, in order to minimize the disparity on pressure on each side of the partition.

Provided that it is compacted or otherwise treated so that flame will not penetrate through it to the face which is nearest the second charge element before it is substantially consumed, the first section of the charge may consist of any solid ashless composition characterised by a relatively slow rate of combustion, for instance, a smokeless propellent composition based on nitrocellulose; or a mixture of nitrocellulose and nitroglycerine; or even a charge of celluloid or similar material capable of sustaining its own combustion at a suitably slow rate in the absence of oxygen without leaving any appreciable ash. The first section may be of a composite structure formed in the manner described and claimed in the specification U. S. Patent No. 2,090,608, or described in application Serial No. 148,949; or a progression of charge elements made of more than one propellent may be employed. It is usually possible to generate the pressures up to about 10 atmospheres during an interval of time of the order of one second by the burning of the necessary quantity of compact propellent explosive in the form of a rod of ¼" diameter burning all over its surface and while the same weight of rod twice that diameter will generate this pressure in a somewhat longer period, the use of sufficient of the material to build up a pressure of several hundred lbs. per sq. in. is not usually permissible since the lower pressure would then be developed in only a small fraction of a second. Consequently, unless the first charge section is constructed as described and claimed in U. S. Patent No. 2,090,608 or as described in application No. 148,949, it may be necessary that its size should be restricted so that it will produce little more than the pressure required to affect the engagement of the moving parts in the associated device.

The second, and more rapidly burning, section of the charge is suitably protected from premature ignition from the first section and the priming means, for instance by fashioning at least the contiguous element of the first section of the charge so that it completely fills the cross-section of the cartridge case; or otherwise, so that the combustion products of the igniter, or the initial combustion products of the first section cannot leak past the unconsumed portion of the first section and cause premature ignition of the second section, or by means of one or more partitions effective initially as barriers to ignition until they have been subjected to the effect of the combustion of a sufficient and substantial portion of the first charge section. The second charge section may be capable of propagating its combustion even at atmospheric pressure, and may consist of either a single element or of a series of charge section elements manifesting progressively increasing rates of combustion when used in the said devices, but the most useful form of this second section is that of a single element in the form of a perforated rod arranged so that as it burns the surface area increases progressively; thereby progressively increasing the rate of combustion.

The second charge section may conveniently consist of a smokeless propellent composition in a form suitable for the relatively rapid development of pressure on combustion; for instance, in the form of a plurality of rods or tubes arranged side by side so as to occupy the cross-section of the cartridge.

In putting the invention into effect, I arrange that the first charge section and the priming means are together at least sufficient to provide the gas pressure required to effect the engagement or contact of the easily movable part with the part of high inertia or resistance, and are adapted to accomplish this pressure development at a suitably slow speed; and that the second charge section is thereafter ignited at least soon enough to maintain the part of high inertia or resistance in motion in the required manner and is adapted to produce a suitable rate of pressure development for this purpose.

The invention is further illustrated but not limited by the following examples and by reference to the drawings attached, of which Figures 1 to 5 represent longitudinal sections of cartridges prepared in accordance with the invention.

*Example 1*

Figure 1 represents a longitudinal section of a cartridge prepared in accordance with this example. The case of the cartridge consists of an unlined 12-bore paper shotgun cartridge case 1 having in the wall a a singe venting hole 2 of 10.5 mm. diameter, the centre of the venting hole being 16 mm. from the base of the cartridge case, which has an internal diameter of 18.8 mm. and an external diameter of 20.0 mm. The ignition means of the cartridge includes an ordinary shotgun cap 3 charged with 0.5 grain of a composition containing mercury fulminate, antimony sulphide and potassium chlorate in the proportions 6:4:6, and a small charge 4 consisting of 0.25 gm. of Schultze smokeless powder loaded in close proximity to the flash hole of the cap chamber 8.

The first charge section consists of two elements; an element 5 comprising a 1.2 gm. disc of Ardeer cordite of the composition stated below 15.3 mm. in diameter and 4 mm. thick; and, in ignition contact therewith, a second element comprising a cylindrical pellet 6, made from guanidine nitrate and other ingredients as undernoted, 18.8 mm. in diameter, 15 mm. long, and weighing 4.9 gm. The Ardeer cordite has the composition: nitroglycerine 27%, nitrocellulose 66%, diethyldiphenyl urea 7%. The second element of the first charge section is made by incorporating guanidine nitrate and ammonium dichromate powders passing an 80 mesh B. S. S. sieve with a strong solution of a low-viscosity industrial nitrocellulose in acetone and compacting the composition in a die to a bulk density of about 1.3 gm. per cc. and then stoving the pellets so formed for a few days at about 40° C. to evaporate off the acetone. The composition of this charge section element is guanidine nitrate 100, ammonium dichromate 2, nitrocellulose 20 parts by weight.

The second charge section 7 consists of four cords of another Ardeer cordite composition, each 7.5 mm. in diameter and 21 mm. long, weighing in all 6 gm., arranged side by side within the case in contact with the element 6 of the first charge section. This Ardeer cordite has the composition: nitroglycerine 41%, nitrocellulose 52%, diethyldiphenyl urea 7%. The cartridge case is closed by means of a cardboard disc 9, 18.8 mm. in diameter and 1.52 mm. thick, secured by the usual type of shotgun case turnover 10.

When tested in a cylindrical closed vessel of 400 cc. capacity, having a breech containing a close-fitting cage or sleeve into which the cartridge exactly fits and provided with a venting hole registering with the vent hole 2 of the cartridge case, the cartridge develops a pressure of approximately 150 lb. per square inch smoothly in a period of about 6.0 seconds before the second charge section 7 commences to ignite. A maximum pressure of about 1700 lb. per square inch is then produced during the following 0.35 second by the combustion of the second charge section 7.

Example 2

Figure 2:
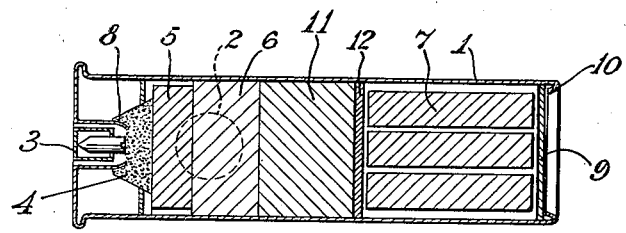

Figure 2 represents a longitudinal section of a cartridge prepared in accordance with this example. The parts 1, 2, 3 and 4 have the same significance as in Example 1, except that the cap composition contains lead styphnate, barium nitrate, antimony sulphide, calcium silicide and tetrazene in the proportions 26:45:7:14:4. The first charge section consists of three elements 5, 6 and 11, of which 5 is the same as the corresponding element in Example 1, and 6 consists of a compacted mixture of guanidine nitrate, ammonium dichromate and nitrocellulose in the proportions 100:1.5:15, made after the fashion described in Example 1 for the corresponding charge element. This element is 11 mm. in length and 18 mm. in diameter, and weighs 4.0 gm. The element 11 consists of 5.0 gm. of a compacted mixture of nitroguanidine, guanidine nitrate and nitrocellulose in the proportions 75:25:2.5, and is made as described in U. S. application No. 148,949. This element is 18.2 mm. in diameter and 13.9 mm. in length. A cardboard disc 12, 18.8 mm. in diameter and 1 mm. in thickness, is interposed between the charge section element 11 and a second charge section 7 consisting of 4 cords of the same Ardeer cordite as is employed for the corresponding charge section in Example 1. Each of the cords is 15.5 mm. long and 7.5 mm. in diameter, the total weight of the second charge section being 4.4 gm. The cartridge is closed by a cardboard disc 9 and a turnover 10.

When the cartridge is tested as in Example 1, the combustion of the smokeless powder 4 and the charge section elements 5, 6 and 11 produces a smooth increase in pressure up to about 270 lb. per square inch in a period of about 20 seconds before the second charge section 7 commences to burn, whereupon the pressure increases to a maximum of 1200 lb. per square inch in the next 0.3 second.

Example 3

Figure 3:
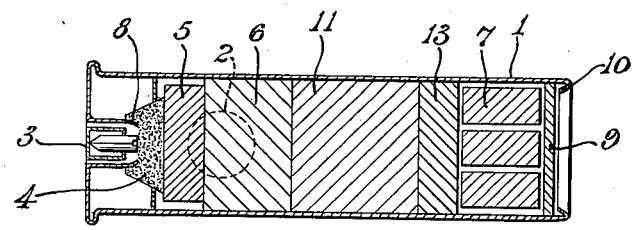

Figure 3 represents a longitudinal section of a cartridge in accordance with this example. The cartridge case 1 is similar to that employed in Example 1, and is similarly provided with a venting hole 2. The cap 3 contains a charge of only 0.2 grain of a composition containing mercury fulminate, antimony sulphide, potassium chlorate, mealed black powder and sulphur in the proportions 19:43:33:2:2.4:2.4. The priming means comprises, in addition to the cap 3, a charge 4 of 0.25 gram Schultze powder. The elements in successive ignition contact comprising the first charge section are: firstly, a disc 5 weighing 1.2 gm. of the same Ardeer cordite as that employed for the corresponding element in Example 1; secondly, a cylindrical pellet 6 of the same composition as the corresponding charge element in Example 1, 18.7 mm. in diameter and 16 mm. long, and weighing 5.9 gm.; thirdly, a cylindrical pellet 11 consisting of 11.6 gm. of a compacted mixture of nitroguanidine and guanidine nitrate in the proportions 3:1, 18.2 mm. in diameter and 30 mm. long; and finally a cylindrical pellet 13 consisting of 2.3 gm. of a compacted mixture of equal parts of nitroguanidine and guanidine nitrate, 18.8 mm. in diameter and 6 mm. long.

The second charge section 7 consists of four rods each 9 mm. long and 7.5 mm. in diameter introduced side by side in contact with the last element of the first charge section, and formed of the same Ardeer cordite as is used for the second charge section in the preceding examples, and weighing in all 2.7 gm. When tested, this cartridge produces a gradual rise in pressure to about 600 lb. per square inch in approximately 40 seconds, whereupon the pressure rises during the next 0.3 second to a maximum of about 1700 lb. per square inch; this rapid rise corresponding to the combustion of the second charge section.

Example 4

Figure 4:
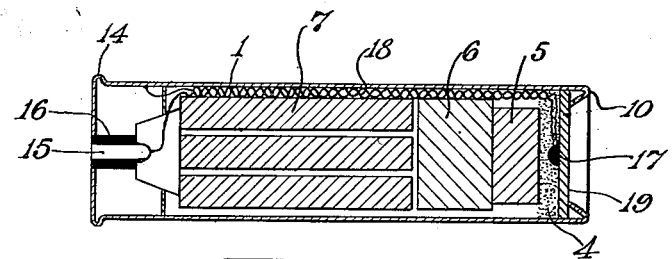

Figure 4 represents a longitudinal section of a cartridge constructed in accordance with this example, which differs from the cartridges of the preceding examples in being adapted for electric instead of percussion ignition, and in venting through the turnover end instead of at the base end of the case. The cartridge case 1 comprises a 12-bore paper shotgun cartridge case, of which the metal shell 14 carries an electrode 15 insulated from it by means of a central insulating column 16. The two insulated lead wires 18 of the electric fuzehead 17 are connected respectively to the metal base shell 14 and the electrode 15. The fuzehead 17 is situated beyond the charge at the remote end from the base and close to a celluloid closure disc 19, which is secured by the turnover 10. In successive ignition contact with the fuzehead are arranged a small charge 4 of Schultze powder and the first element 5 of the first charge section, which has the same composition, weight and dimensions as the corresponding element in Example 1. The second element of the first section consists of a cylindrical pellet 6 of celluloid, 18.8 mm. in diameter and 10 mm. in length. The second charge section 7, in ignition contact with the celluloid pellet 6, is the same as the corresponding charge section in Example 1.

Example 5

Figure 5:
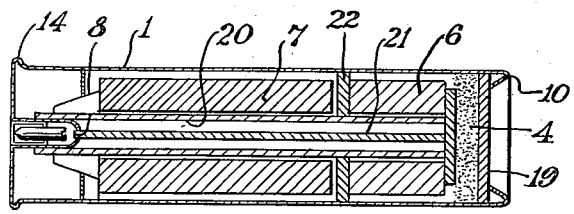

Figure 5 represents a longitudinal section of a cartridge constructed in accordance with this example. The cartridge of this example is designed for percussion ignition, and for venting through the turnover end of the case. The metal base shell 14 of a metal 12-bore shotgun case 1 carries a percussion cap 3 containing the same charge as the cap in Example 3. The metal tube 20 is fitted as an extension of the cap chamber 8 and extends over nearly the whole length of the cartridge. The second and rapidly burning charge section 7 is in this case the first to be loaded, and consists of six cords of an Ardeer cordite composition containing nitroglycerine, 45; nitrocellulose, 52; diethyldiphenyl urea, 3 parts; disposed symmetrically around the axial flash tube. The cords are 20 mm. long and 5.5 mm. in diameter, and weigh 4.5 gm. in all. Between the charge section 7 and the slow-burning first charge section 6 is interposed a cardboard disc 22 in diameter equal to the internal diameter of the cartridge case and sufficiently thick to prevent the premature ignition of the charge section 7 from the charge section 6, which consists of a single annular cylindrical pellet of an Ardeer cordite composition (nitroglycerine 27%, nitrocellulose 66%, diethyldiphenyl urea 7%) 15 mm. long, having an external diameter equal to the internal diameter of the case; the axial channel being just sufficient to allow the charge section to be inserted over the tube 20. A quickmatch fuse 21 extends along the tube 20 from the cap 3 to the remote end of the tube, where it is turned over so as to convey the ignition to a charge 4 consisting of 0.25 gm. Schultze powder interposed between the charge section 6 and the celluloid closure disc 19, which is held in position by the turnover 10.

In the above examples the cartridges are tested in a fixed volume apparatus, and it will be understood that in such apparatus the pressure generated by the first section of the charge will be only a small fraction of the total pressure generated by the cartridge. Moreover, for such testing purposes the magnitude of the second section of the charge may conveniently be smaller than is desirable in practice where it is necessary to maintain an effective pressure on a piston, the total displacement of which may be considerable. In the following example the cartridge is tested in a cylinder and piston device and the size of the second section is correspondingly greater than in the foregoing Examples 1–5.

*Example 6*

The following example describes a cartridge adapted for use in an aeroplane engine starter.

The cartridge case and percussion cap are as described in Example 3, and in addition to the percussion cap the priming means comprises a charge of 0.1 gm. Schultze powder and a length of quickmatch tape, 56 mm. by 6 mm. weighing 0.2 gm. The first section of the charge consists of two elements of the Ardeer cordite used for element 5 in Example 1; the first of these elements is 13 mm. long and 15.3 mm. diameter, weighs 3.9 gm. and is wrapped round by the length of quickmatch tape, and the second element is 7 mm. long and 15.3 mm. diameter, weighs 2.1 gm. and is enclosed in a tight fitting sleeve of rubber tubing of such external diameter that the enclosed element is a tight fit inside the case.

The second section of the charge consists of four rods of the same material as element 7 in Example 1, each 60 mm. in length, weighing in all 16 gm. The cartridge case is closed by a cardboard disc 18.8 mm. diameter and 1.5 mm. thick with a central hole 1.5 mm. diameter. The disc is secured by a turnover of the usual type. The elements and sections are loaded in the above mentioned order.

When the cartridge is tested in an engine starter coupled to a dynamometer and having a breech of the type described in Example 1, the engagement of the clutch takes place without shock and, about three seconds after firing, the starter rotates the dynamometer through about one revolution in about 0.3 sec. against a torque of about 500 lb.-ft. The ignition of the second section of the charge commences when the pressure is about 150 lb. per sq. in. and the maximum pressure attained during the rotation of the dynamometer is about 700 lb. per sq. in.

The priming means used may consist of a friction-operated match, or a percussion cap, or a spark gap or electrically heated bridge wire embedded in a suitable deflagrating composition. For convenience in construction, I prefer to use either an electric fusehead as commonly employed in the manufacture of electric detonators, or a percussion cap as fitted to the ordinary shotgun cartridge. If desired, a small charge of black powder, dry fibrous nitrocellulose, sporting powder, or the like may be used as part of the priming means to insure ignition of the first section of the charge. As suitable priming compositions are in general characterised by exceedingly rapid combustion, I avoid the use of a priming composition or igniting arrangement in such quantity as would produce a sudden initial rise of pressure in the device to such a height that the engagement of the moving parts would thereby be effected. This may otherwise be avoided by the use of substantially gasless priming compositions.

As a partition for preventing the premature ignition of the second charge section, I may employ a disc of celluloid, cardboard, felt, fibre, ebonite, phenolformaldehyde resin or similar combustible material capable of being destroyed or charred through by the combustion of a substantial proportion of the first section of the charge, but not merely by the combustion of the priming means and a small remote portion of the first section of the charge. Where tightly-fitting partitions or charge elements are used, I prefer to provide a small vent in the casing of the charge on the side of the partition or plug remote from the igniter in order to balance the pressures on each side of the partition or plug.

An outstanding advantage attending the use of the cartridge of the present invention is that the provision of a gas reservoir or expansion chamber on the device is unnecessary, or its capacity may be considerably reduced. Furthermore, the engagement of the relatively easily movable part of the device with the part of high inertia or resistance may be rendered much less violent than hitherto. Devices of the kind described may therefore be of less bulky and heavy construction than hitherto for carrying out the same work.

As many apparently widely different embodiments of this invention may be made without departing from the spirit and scope thereof it is to be understood that I do not limit myself to the specific embodiments thereof except as defined in the appended claims.

I claim:

1. A gas producing cartridge suitable for the operation of mechanical devices of the kind described and comprising a substantially ashless self-combustible charge, initiating means therefor, and a shell containing the same, the said charge comprising at least two sections of which the first is directly ignitable by said initiating means and comprises a solid body substantially filling the cross-section of said shell and of composition and weight sufficient for the slow generation of gas over a period at least of the order of 1 second, the second section being adapted for the rapid generation of gas, and sealing means disposed between said second section and said first section hermetically separating the same so that the ignition of said second section is prevented until substantially complete combustion of said first section has occurred.

2. A gas producing cartridge suitable for the operation of mechanical devices of the kind described and comprising a substantially ashless self-combustible charge and initiating means therefor, and a shell containing the same, the said charge comprising at least two sections of which the first is directly ignitible by said initiating means and comprises a solid body substantially filling the cross-section of said shell and of composition and weight sufficient for the slow generation of gas over a period at least of the order of 1 second and having a plurality of charge elements including an initial charge element capable of self-propagating combustion when ignited at atmospheric pressure and at least one further charge element capable of self-propagating combustion only when ignited at a pressure generated by the previous charge element, the second section comprising a smokeless propellent powder adapted for the rapid generation of gas, and a sealing means disposed between said first charge section and said second charge section hermetically separating the same so that the ignition of said second charge section is prevented until substantially complete combustion of the first section has occurred.

3. A gas producing cartridge suitable for the operation of mechanical devices of the kind described and comprising a substantially ashless self-combustible charge and initiating means therefor, and a shell containing the same, the said charge comprising at least two sections of which the first is directly ignitible by said initiating means and comprises a solid body substantially filling the cross-section of said shell and of composition and weight sufficient for the slow generation of gas over a period at least of the order of 1 second and having a plurality of charge elements including an initial charge element capable of self-propagating combustion when ignited at atmospheric pressure, and at least one further charge element comprising nitro guanidine and capable of self-propagating combustion only when ignited at a pressure generated by the previous charge element, the second section comprising a smokeless propellent powder adapted for the rapid generation of gas, and a sealing means disposed between said first charge section and said second charge section hermetically separating the same so that the ignition of said second charge section is prevented until substantially complete combustion of the first section has occurred.

4. A gas producing cartridge suitable for the operation of mechanical devices of the kind described and comprising a substantially ashless self-combustible charge, initiating means therefor, and a shell containing the same, the said charge comprising at least two sections of which the first is directly ignitible by said initiating means and consists of a single compacted solid body comprising colloided nitrocellulose substantially filling the cross-section of said shell and of weight sufficient for the slow generation of gas over a period at least of the order of 1 second, the second section being adapted for the rapid generation of gas, and sealing means disposed between said second section and said first section, hermetically separating the same so that the ignition of said second section is prevented until substantially complete combustion of said first section has occurred.

5. A gas producing cartridge suitable for the operation of mechanical devices of the kind described and comprising a substantially ashless self-combustible charge, initiating means therefor, and a shell containing the same, the said charge comprising at least two sections of which the first is directly ignitible by said initiating means and comprises a solid body substantially filling the cross-section of said shell and of composition and weight sufficient for the slow generation of gas over a period at least of the order of 1 second, the second section being adapted for the rapid generation of gas, and sealing means disposed between said second section and said first section, separating the same so that the ignition of said second section is prevented until substantially complete combustion of said first section has occurred, said sealing means comprising a solid partition filling the internal cross-section of said shell and adapted to be destroyed by the heat of combustion of said first charge section during the last stage of combustion of said first section.

6. A gas producing cartridge suitable for the operation of mechanical devices of the kind described and comprising a substantially ashless self-combustible charge, initiating means therefor, and a shell containing the same, the said charge comprising at least two sections of which the first is directly ignitible by said initiating means and comprises a solid body substantially filling the cross-section of said shell and of composition and weight sufficient for the slow generation of gas over a period at least of the order of 1 second, the second section being adapted for the rapid generation of gas, said first section being disposed between said second section and said igniting means, effecting a hermetic seal which prevents the ignition of said second section until substantially complete combustion of said first section has occurred.

7. A gas producing cartridge suitable for the operation of mechanical devices of the kind described and comprising a substantially ashless self-combustible charge, initiating means therefor, and a shell containing the same, the said charge comprising at least two sections of which the first is directly ignitible by said initiating means and comprises a solid body substantially filling the cross-section of said shell and of composition and weight sufficient for the slow generation of gas over a period at least of the order of 1 second, the second section being adapted for the rapid generation of gas, and sealing means disposed between said second section and said first section hermetically separating the same, said sealing means being characterized by a structure such that the ignition of said second section is prevented for an interval of the order of at least 1 second after the ignition of said first section.

8. A gas producing cartridge suitable for the operation of mechanical devices of the kind described and comprising a substantially ashless self-combustible charge, initiating means therefor, and a shell containing the same, the said charge comprising at least two sections of which the first is directly ignitible by said initiating means and consists of a solid compacted body substantially filling the cross-section of said shell comprising colloided nitrocellulose of weight sufficient for the slow generation of gas over a period at least of the order of 1 second, the second section being adapted for the rapid generation of gas, and sealing means disposed between said second section and said first section, hermetically separating the same, said sealing means being characterized by a structure such that the ignition of said second section is prevented for an interval of the order of at least 1 second after the ignition of said first section.

JOHN MACFIE HOLM.